United States Patent
Brennan et al.

(10) Patent No.: US 6,487,412 B1
(45) Date of Patent: Nov. 26, 2002

(54) METHOD AND SYSTEM FOR ROUTING CALLS TO WIRELESS DIRECTORY NUMBERS IN A NETWORK

(75) Inventors: Stephen P. Brennan, Bedford, TX (US); Michael Dellangelo, Colleyville, TX (US); Walter Wesley Howe, Alpharetta, GA (US); Michael J. Petrey, Arlington, TX (US)

(73) Assignees: GTE Wireless Service Corporation, Alpharetta, GA (US); Verizon Corporate Service Group Inc., New York, NY (US)

( * ) Notice: Subject to any disclaimer, the term of this patent is extended or adjusted under 35 U.S.C. 154(b) by 0 days.

(21) Appl. No.: 09/340,508

(22) Filed: Jul. 1, 1999

(51) Int. Cl.[7] .............................................. H04Q 7/20
(52) U.S. Cl. ...................... 455/445; 445/428; 445/432; 379/220.01; 379/221.1
(58) Field of Search ................................ 455/445, 433, 455/560, 561, 428, 432; 379/218.01, 221.09, 221.1, 229, 232, 220.01

(56) References Cited

U.S. PATENT DOCUMENTS

| | | | | |
|---|---|---|---|---|
| 4,191,860 A | | 3/1980 | Weber ........................ 179/18 |
| 5,315,636 A | * | 5/1994 | Patel .......................... 455/445 |
| 5,353,331 A | | 10/1994 | Emery et al. ................. 379/58 |
| 5,400,338 A | * | 3/1995 | Flammer, III ............... 455/445 |
| 5,506,887 A | | 4/1996 | Emery et al. ................. 379/58 |
| 5,574,904 A | | 11/1996 | Yunoki et al. ............... 395/601 |
| 5,610,972 A | | 3/1997 | Emery et al. ................. 379/58 |
| 5,664,005 A | | 9/1997 | Emery et al. ............... 455/422 |
| 5,680,440 A | * | 10/1997 | Ghisler et al. .............. 455/445 |
| 5,703,939 A | * | 12/1997 | Bushnell ..................... 379/113 |
| 5,758,281 A | | 5/1998 | Emery et al. ............... 455/428 |
| 5,815,561 A | * | 9/1998 | Nguyen et al. ............. 379/115 |
| 5,842,126 A | * | 11/1998 | Sawyer et al. ............. 455/428 |
| 5,878,348 A | * | 3/1999 | Foti ............................ 455/445 |
| 5,901,359 A | * | 5/1999 | Malmstrom ............ 379/221.08 |
| 5,915,222 A | * | 6/1999 | Olsson et al. .............. 455/445 |
| 5,924,035 A | * | 7/1999 | Joensuu ...................... 455/445 |
| 5,943,620 A | * | 8/1999 | Boltz et al. ................. 455/445 |
| 5,978,677 A | * | 11/1999 | Sawyer ....................... 455/445 |
| 6,006,094 A | * | 12/1999 | Lee ............................. 455/432 |
| 6,044,261 A | * | 3/2000 | Kazmi ........................ 455/445 |
| 6,044,274 A | * | 3/2000 | Vo et al. ..................... 455/445 |

* cited by examiner

*Primary Examiner*—William Trost
*Assistant Examiner*—Simon Nguyen
(74) *Attorney, Agent, or Firm*—James K. Weixel

(57) ABSTRACT

Methods and systems are provided for establishing calls to wireless directory numbers (DNs) in a telecommunications network. When a call is directed to a wireless DN, a first node in the network identifies a signaling node associated with the wireless DN and sends the identified signaling node a request for a route to the wireless DN. If the wireless device associated with wireless DN is outside of its home area and is served by a visited node in the network, the signaling node determines a route that excludes the home node associated with the wireless DN and returns a temporary location directory number (TLDN) to the first node. Using the TLDN, the first node then establishes a connection to the visited node.

26 Claims, 7 Drawing Sheets

METHOD AND SYSTEM FOR ROUTING CALLS TO WIRELESS DIRECTORY NUMBERS IN A NETWORK

BACKGROUND OF THE INVENTION

1. Field of the Invention

The present invention relates to telecommunication networks and, more particularly, to a method and system for routing calls directed to wireless directory numbers in a telecommunications network.

2. Background of the Art

In the present telecommunications networks, a wireline telephone number or directory number (DN) is associated with a fixed geographic location and is served by a single wireline switch. A wireless DN, however, is associated with multiple geographic locations and is served by any one of a number of wireless switches depending on the specific geographic location of the associated wireless device at the time a call is made. This portability of a wireless DN is one of the basic attributes of wireless telephony.

A pair of home location register and visited location register in a telecommunications network provide seamless roaming when a call is placed to or from a wireless DN. A home location register is associated with a home wireless switch where a wireless DN resides (i.e., the wireless switch to which all incoming calls to the wireless DN are directed). A wireless device is located within its home area when the wireless device can directly communicate with its associated home wireless switch (i.e., located in the area covered by the home wireless switch).

A visitor location register is associated with a wireless switch currently serving a wireless device that is outside of its home area. A wireless device is outside of its home area (or roams) when the wireless device cannot directly communicate with the home wireless switch and instead communicates with another wireless switch, which is referred to as a visited wireless switch.

One problem with the present telecommunication networks is that two connections must be established when a call is placed to a wireless DN whose associated wireless device is outside of its home area. In such instances, the telecommunications network first establishes a connection to the home wireless switch associated with the wireless DN. The home wireless switch then establishes a second connection to a visited wireless switch that currently serves the wireless DN.

As an illustration, FIG. 1 shows a block diagram of a conventional telecommunications network 100. Telecommunications network 100 comprises a wireline switch 110, a home wireless switch 120, a home location register 130, a signal transfer point (STP) 135, a visitor location register 140, a visited wireless switch 150, a wireline telephone 155, antenna 170, and a wireless device 175.

Typically, a wireline subscriber using telephone 155 initiates a call request 180a by dialing the wireless DN associated with wireless device 175. When wireline switch 110 receives call request 180a, wireline switch 110 establishes a first connection 180b via a Public Switched Telephone Network (PSTN) 160 to home wireless switch 120, which is the home switch associated with the dialed DN.

Home wireless switch 120 sends an "Interim Standard 41" (IS-41) route_request message 180c to its associated home location register 130, requesting the current location of wireless device. The IS-41 standard is described in "Radio Telecommunications Intersystem Operations," ANSI/TIA/EIA/41-D-1997, which is incorporated herein by reference. The IS-41 standard describes the communication protocol between home wireless switch 120, home location register 130, visitor location register 140, and visited wireless switch in telecommunications network 100.

If wireless device is outside of its home area as shown in FIG. 1, home location register 130 then identifies the visitor location register with which wireless device 175 last registered, for example visitor location register 140, and sends an IS-41 route_request message 180d via STP 135 to visitor location register 140.

Visitor location register 140 forwards route_request message 180d to its associated visited wireless switch 150, requesting a route to wireless device 175. Visited wireless switch 150 computes a temporary local directory number (TLDN), which can be used in establishing incoming calls to wireless device 175. Visited wireless switch 150 then returns the TLDN to visitor location register 140 in an IS-41 message 180e. Visitor location register 150 then sends via STP 135 to home location register 130 an IS-41 route_request_response message 180f that includes the TLDN.

Home location register 130 forwards route_request_response message 180f to home wireless switch 120. Using the TLDN in route_request_response message 180f, home wireless switch 130 then establishes a second connection 180g to visited wireless switch 150, which sends a ring signal to wireless device 175. Thus, to establish a call between telephone 155 and wireless device 175 when wireless device 175 is outside of its home area, telecommunications network 100 must establish two separate connections 180b and 180g.

SUMMARY OF THE INVENTION

It is therefore desirable to have a method and system for reducing the number of connections that must be established in a telecommunications network when connecting a call to a wireless device that is located outside of its home area.

Methods and systems consistent with the present invention establish a call to a wireless DN in a telecommunications network by identifying a signaling node associated with the wireless DN, determining, at the signaling node, a route that excludes the home node associated with the wireless DN when the associated wireless device is outside of its home area, and establishing a connection via the determined route to a visited node in the network that currently serves the wireless DN.

In one embodiment, a first node receives a call request directed to a wireless DN when the wireless device associated with the wireless DN is outside of its home area. The first node invokes a trigger that identifies a signaling node associated with the wireless DN and requests from the signaling node a route for establishing the call to the wireless DN. The signaling node then determines a route that does not include the home node associated with the wireless DN. The first node then establishes via the determined route a single connection to a visited node serving the wireless DN. Accordingly, the telecommunications network establishes the call to the wireless DN without establishing a connection to the home node.

This summary and the following description of the invention should not restrict the scope of the claimed invention. Both provide examples and explanations to enable others to practice the invention.

BRIEF DESCRIPTION OF THE DRAWINGS

The accompanying drawings, which form part of the description of the invention, show several embodiments of the invention, and together with the description, explain the principles of the invention.

In the Figures.

DETAILED DESCRIPTION

The following description of embodiments of this invention refers to the accompanying drawings. Where appropriate, the same reference numbers in different drawings refer to the same or similar elements.

Methods and systems consistent with the present invention establish a single connection in a telecommunications network when connecting calls to wireless directory numbers (DNs) regardless of whether the associated wireless devices are within or outside of their respective home areas. In one embodiment, when a call is directed to a wireless DN, a wireline switch in the network identifies a signaling node associated with the wireless DN and sends the identified signaling node a request for a route to the wireless DN. If the wireless device associated with wireless DN is outside of its home area and is served by a visited node in the network, the signaling node determines a route that excludes the home node associated with the wireless DN and returns a temporary location directory number (TLDN) to the wireline switch. Using the TLDN, the wireline switch establishes a connection to the visited node, which sends a ring signal to the associated wireless device.

Figure 1:
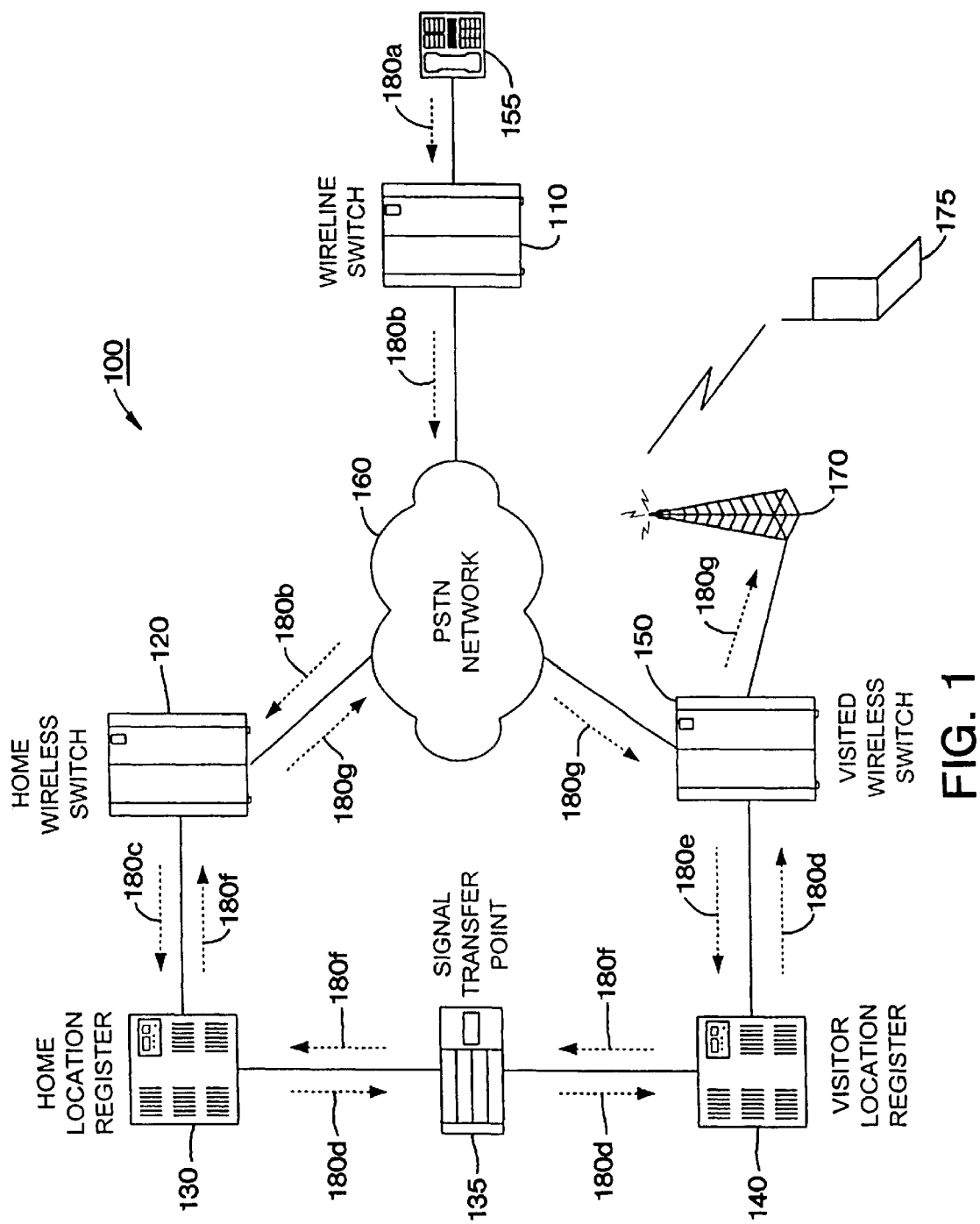
FIG. 1 is a block diagram of a conventional telecommunications network.
Figure 2:
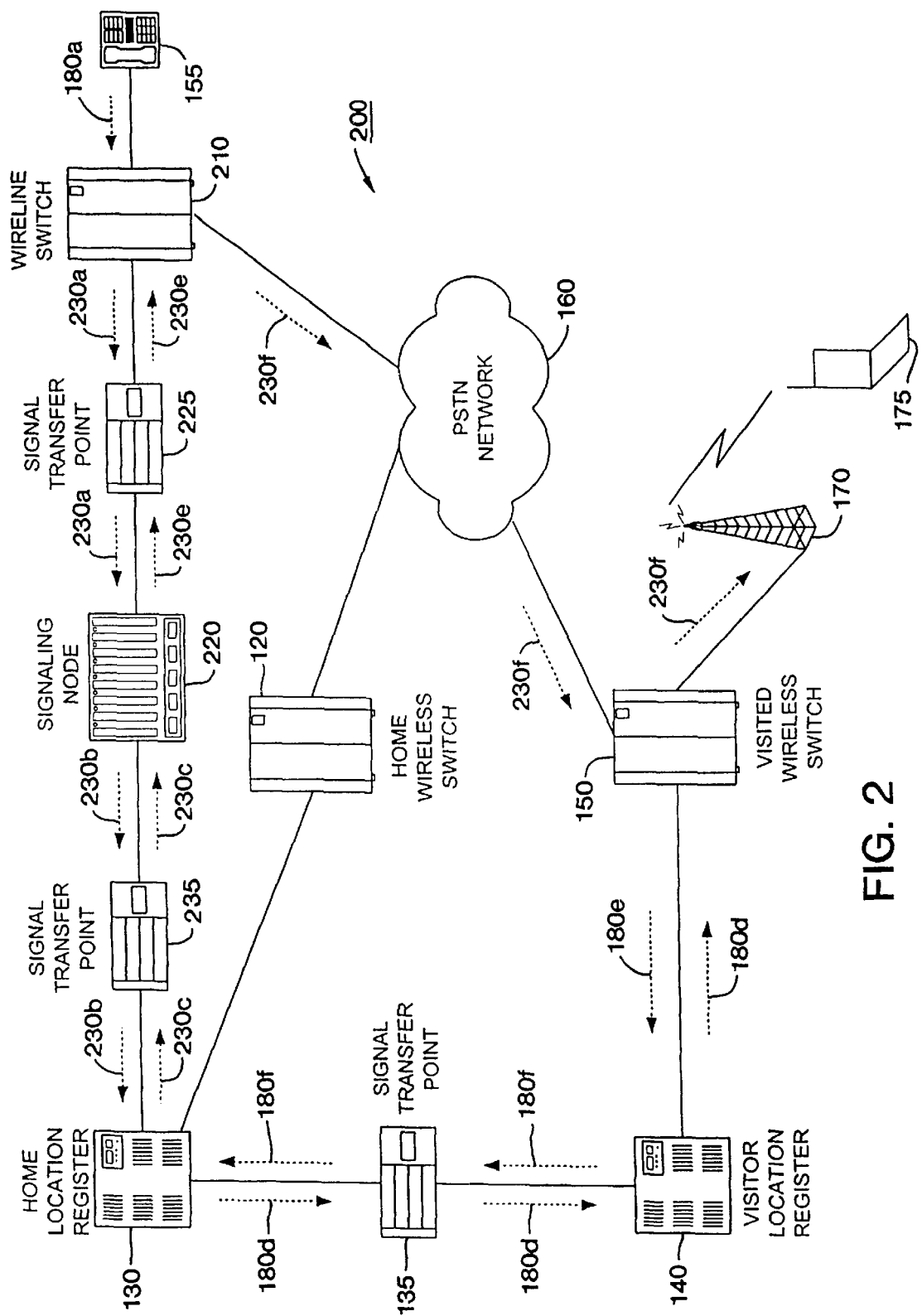
FIG. 2 is a block diagram of a telecommunications network in accordance with methods and systems consistent with the present invention.

FIG. 2 is a block diagram of a telecommunications network 200 in accordance with methods and systems consistent with the present invention. As shown, telecommunications network 200 comprises a wireline switch 210, a signaling node 220, signal transfer points (STPs) 135, 225, and 235, home wireless switch 120, home location register 130, visitor location register 140, visited wireless switch 150, antenna 170, and wireless device 175.

Wireline switch 210 connects to telephone 155 having an associated directory number, PSTN network 160, and STP 225. Wireline switch 210 may include, for example, a 5ESS™, DMS-100™ (or DMS-200™), GTD-5™, or an EWSD™ switching system manufactured by Lucent Technologies, Inc., Nortel Networks Corporation, AGCS, and Siemens, respectively. As explained below in detail, wireline switch 210 is configured to communicate with signaling node 220 when establishing incoming calls to wireless DNs, for example the wireless DN associated with wireless device 175.

Signaling node 220 interfaces home location register 130 via STP 235, which routes signaling messages in telecommunications network 200. Alternatively, signaling node 220 may interface with home location register 130 via a signaling network such as, a Signaling System 7 (SS7) network or an Internet Protocol (IP) network. Signaling node 220 may include a Service Control Point (SCP) such as, AI-NET™, Integrated Service Control Point (ISCP™), or Service Builder™ equipment/software manufactured or provided by Lucent Technologies, Inc., Telcordia Technologies, Inc., and Nortel Networks Corporation, respectively.

Home location register 130 interfaces via STP 235 with signaling node 220 and via STP 135 with visitor location register 140. Home location register 130 stores information about wireless subscribers in telecommunications network 200 such as, the current location of a wireless device associated with a subscriber, billing information, and services that the wireless subscriber is authorized to use. Visitor location register 140 stores information about the current location of a wireless device when a wireless device is activated outside of its home area. For example, in telecommunications network 200, wireless device 175 is within its home area when wireless device 175 directly communicates with home switch 120. However, wireless device 175 is outside of its home area when wireless device 175 cannot directly communicate with home wireless switch 120 and instead communicates with visited wireless switch 150.

STPs 135, 225, and 235 route signaling messages such as, Advanced Intelligent Network (AIN), IS-41, and SS7 messages in telecommunications network 200. Each STP 135, 225, and 235 may be an adjunct to a wireline or a wireless switch in telecommunications network 200.

Call flow processing in telecommunications network 200 will be explained in detail below with reference to FIGS. 6 and 7.

Figure 3:
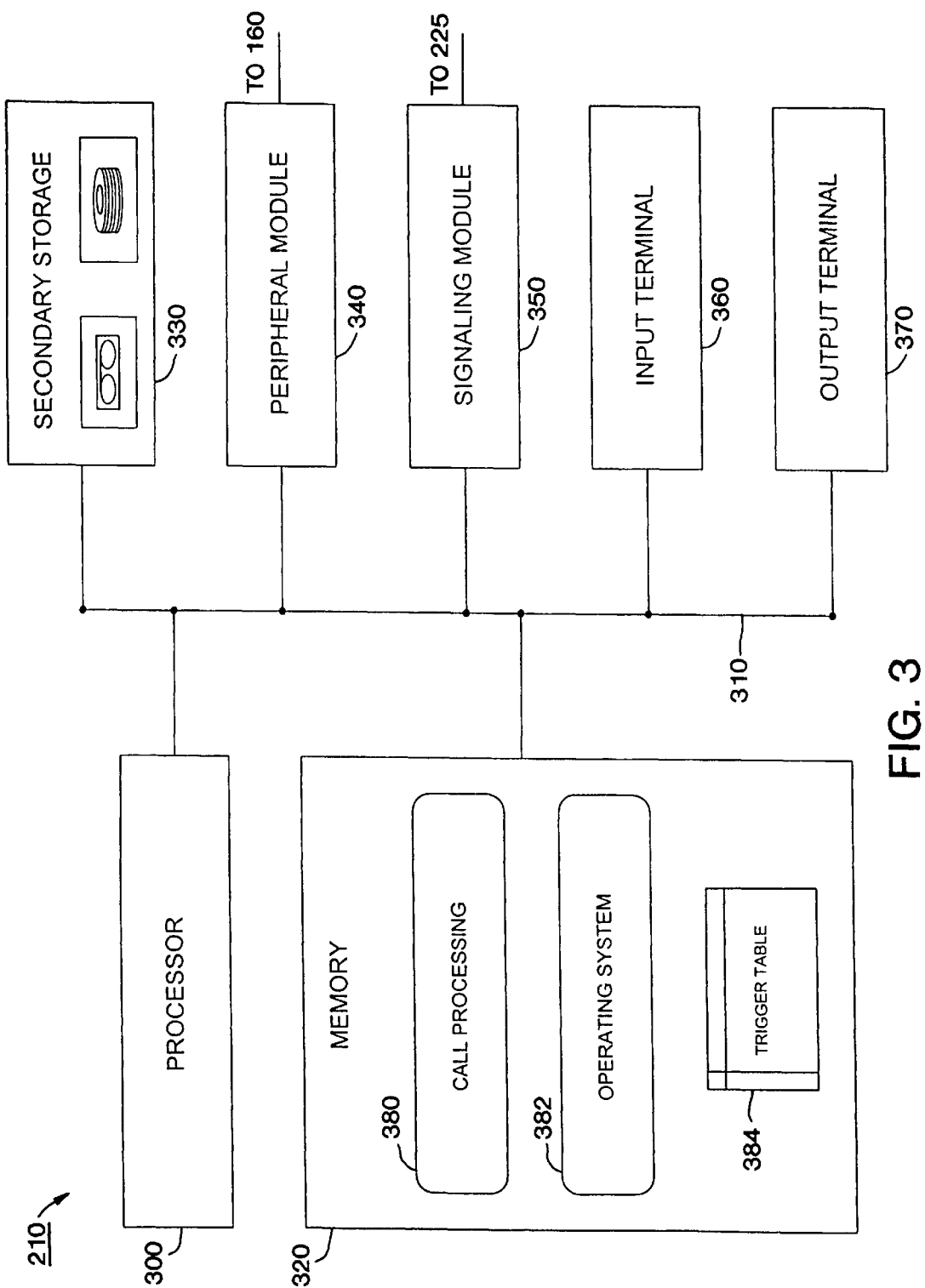
FIG. 3 is a block diagram of wireline switch in a telecommunications network in accordance with methods and systems consistent with the present invention.

FIG. 3 is a block diagram of wireline switch 210 in accordance with methods and systems consistent with the present invention. As shown, wireline switch 210 comprises a processor 300, which connects via a bus 310 to a memory 320, a secondary storage 330, a peripheral interface module 340, a signaling interface module 350, an input terminal 360, and an output terminal 370.

Memory 320 includes a call processing 380, an operating system 382, and a trigger table 384, all of which are executed byprocessor 300. Call processing 380 includes software and data for establishing, maintaining, and terminating calls between subscribers. Operating system 382 includes software and data for non-switching functions, which include, for example, task scheduling and processor interrupt handling. As explained below in detail, trigger table 384 includes entries that are used to intercept calls destined to wireless DNs and to identify the associated signaling nodes for routing calls to wireless DNs without establishing connections to the home wireless switches associated with the wireless DNs.

Peripheral interface module 340 interfaces with trunks that connect wireline switch 210 to PSTN network 160. The trunks carry calls, which may include, voice, data, and video, established in telecommunications network 200.

Signaling interface module 350 transmits to and receives from STP 225 signaling information such as, AIN and IS-41 messages. For example, signaling interface module 350 converts signaling information generated by call processing 380 into AIN or IS-41 messages and transmits the messages to STP 225. Likewise, signaling interface module 350 receives AIN or IS-41 messages from STP 225 and converts the messages into an internal format for processing by call processing 380.

Secondary storage 330 includes a computer readable medium such as a disk drive and a tape drive. From the tape drive, software and data may be loaded onto the disk drive, which can then be copied into memory 320. Similarly, software and data in memory 320 may be copied onto the disk drive, which can then be loaded onto the tape drive.

Input terminal 360 may include an input device such as, a keyboard, and output terminal 370 may include a display device.

Figure 4:
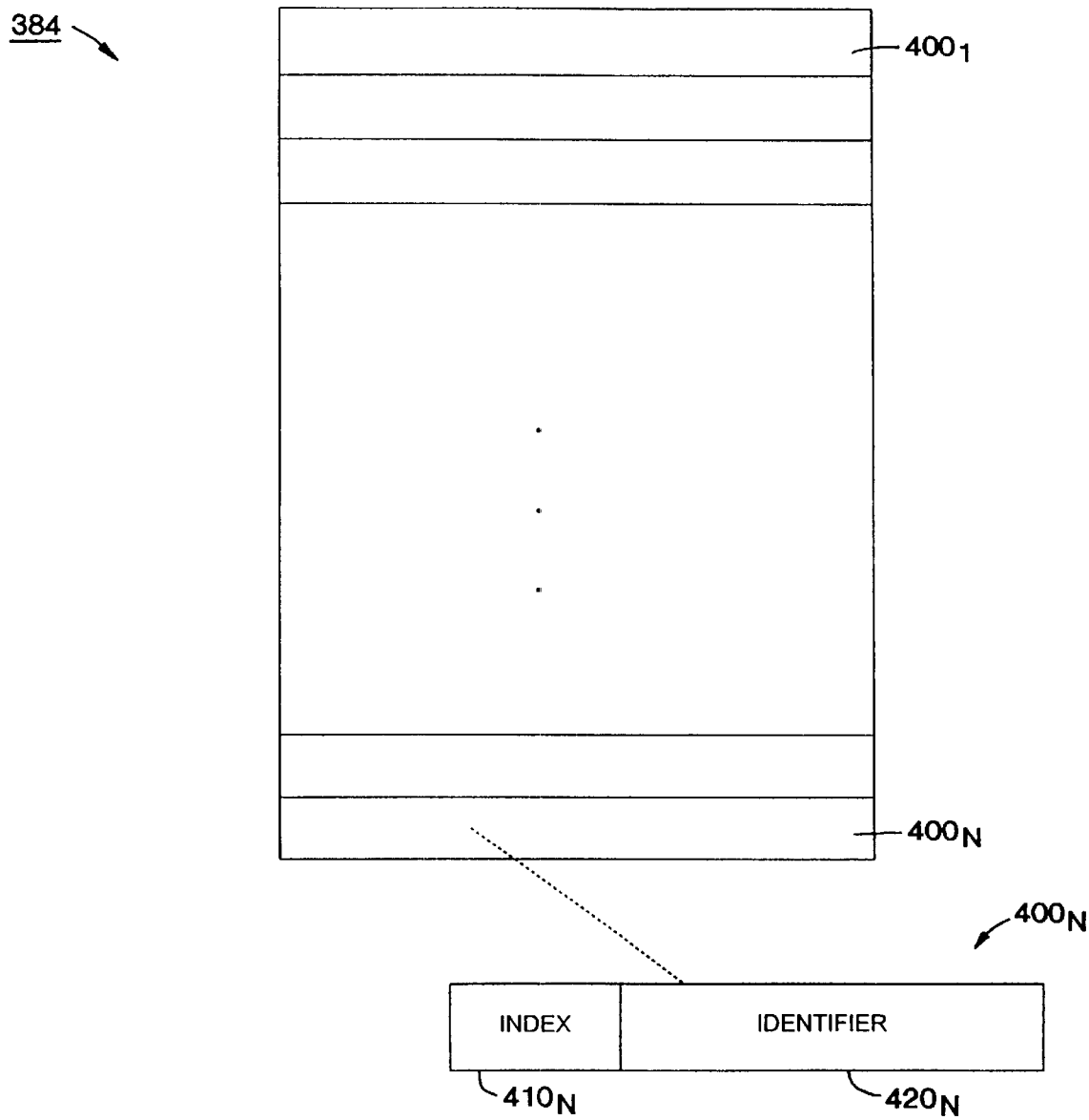
FIG. 4 is a block diagram of a trigger table in a wireline switch in accordance with methods and systems consistent with the present invention.

FIG. 4 is a block diagram of trigger table 384 in accordance with methods and systems consistent with the present invention. Trigger table 384 includes N predetermined triggers shown as entries $400_1$–$400_N$, where each entry includes an index field and an identifier field. For example, entry $400_N$ may include an index field $410_N$ and an identifier field $420_N$. In an embodiment where triggers $400_1$–$400_N$ are Public Office Dialing Plan (PODP) triggers, an index field may include a 3, 6, or 10 digit string such as, an area code, an area code and an office code, or a DN. PODP triggers are described in AIN 0.1 standards TR-NWT-001284: Advanced Intelligent Network (AIN) 0.1 Switching System Generic Requirements, Issue 1 (August 1992) and TR-NWT-001285: Advanced Intelligent Network (AIN) 0.1 Service Control Point (SCP) Application Protocol Interface Requirements, Issue 1 (August 1992), both of which are incorporated herein by reference.

Alternatively, in an embodiment where triggers $400_1$–$400_N$ are Specific Digit String (SDS) triggers, an index may include any sequence of digits. SDS triggers are described in AIN 0.2 standards GR-1298-CORE: AIN SSP, AINGR: Switching Systems (A Module Of AINGR, FR-15), Issue 4 (September 97) and GR-1299-CORE: AINGR: Switch-Service Control Point (SCP)/Adjunct Interface (A Module Of AINGR, FR-15), Issue 4 (September 1997), both of which are incorporated herein by reference.

An identifier field includes a numeric string that identifies a signaling node associated with any wireless DN whose area code, area code and office code, or DN matches the associated index field in trigger table 384. For example, trigger table 384 may be configured to include a trigger entry $400_N$, where index $400_N$ includes the area code associated with the DN assigned to wireless device 175 and identifier $420_N$ includes a translation type/global title address (TT/GTA) associated with signaling node 220. The TT/GTA may then be communicated to STP 225 for determining a point code associated with signaling node 220. Alternatively, identifier $420_N$ may include a point code associated with signaling node 220, which may be used by wireline switch 210 to directly identify signaling node 220.

Figure 5:
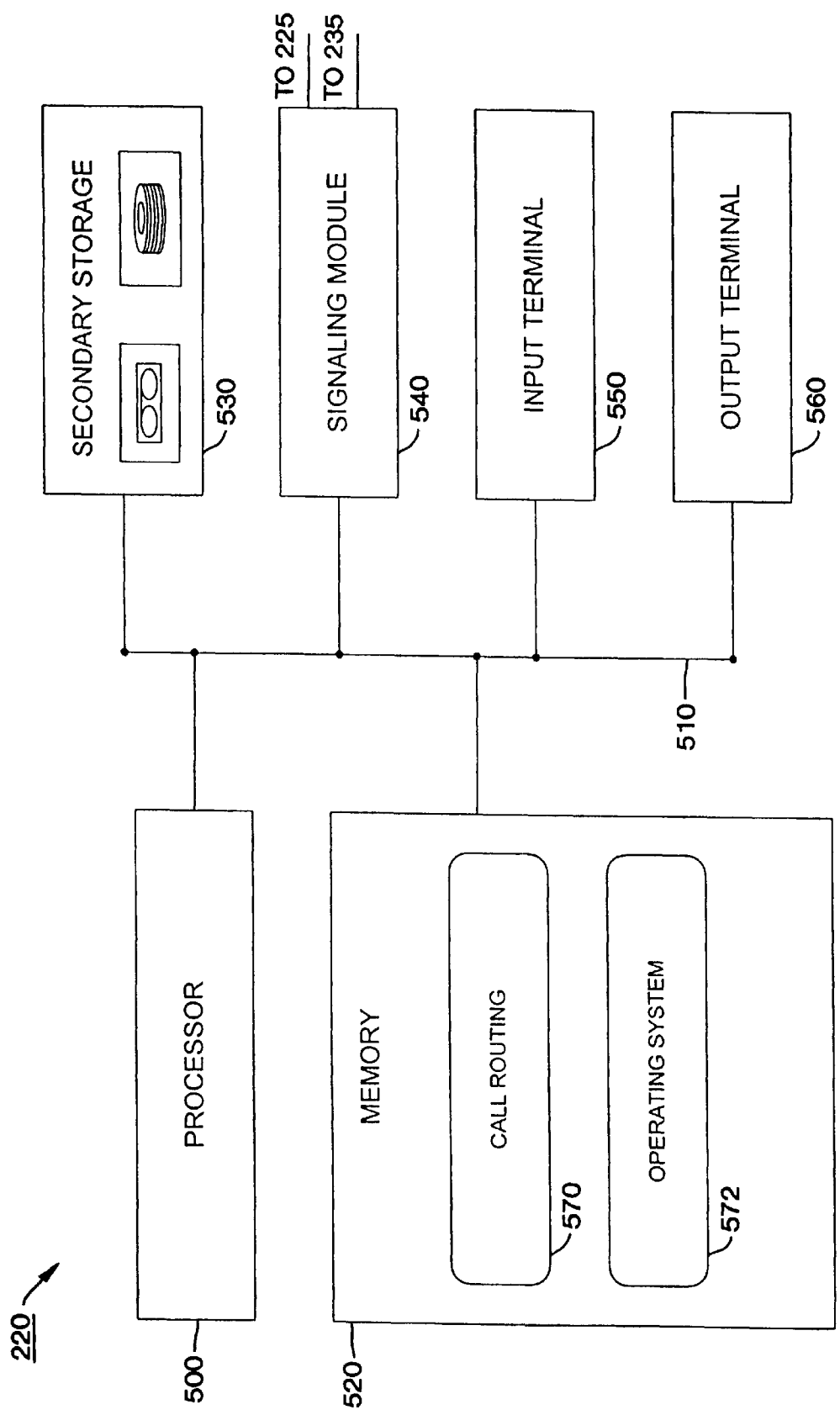
FIG. 5 is a block diagram of a signaling node in a telecommunications network in accordance with methods and systems consistent with the present invention.

FIG. 5 is a block diagram of signaling node 220 in accordance with methods and systems consistent with the present invention. Signaling node 220 comprises a processor 500, which connects via a bus 510 to a memory 520, a secondary storage 530, a signaling interface module 540, an input terminal 550, and an output terminal 560.

Memory 520 includes a call routing 570 and an operating system 572. Call routing 570 includes software and data for communicating with home location register 130 and other databases (not shown) such as, a Call Management Services Database (CMSDB), a Line Information Database (LIDB), and a Business Service Database (BSDB) in telecommunications network 200 when determining a route to a wireless DN such as, the wireless DN associated with wireless device 175.

Signaling interface module 540 transmits to and receives from STPs 225 and 235 signaling information such as, AIN and IS-41 messages. For example, signaling interface module 540 converts signaling information generated by call routing 570 into AIN or IS-41 messages and transmits the messages to STPs 225 and 235. Likewise, signaling interface module 540 receives AIN or IS-41 messages from STPs 225 and 235 and converts the messages into an internal format for processing by call routing 570.

Secondary storage 530 includes a computer readable medium such as a disk drive and a tape drive. From the tape drive, software and data may be loaded onto the disk drive, which can then be copied into memory 520. Similarly, software and data in memory 520 may be copied onto the disk drive, which can then be loaded onto the tape drive.

Input terminal 550 may include an input device such as, a keyboard, and output terminal 560 may include a display device.

Figure 6:
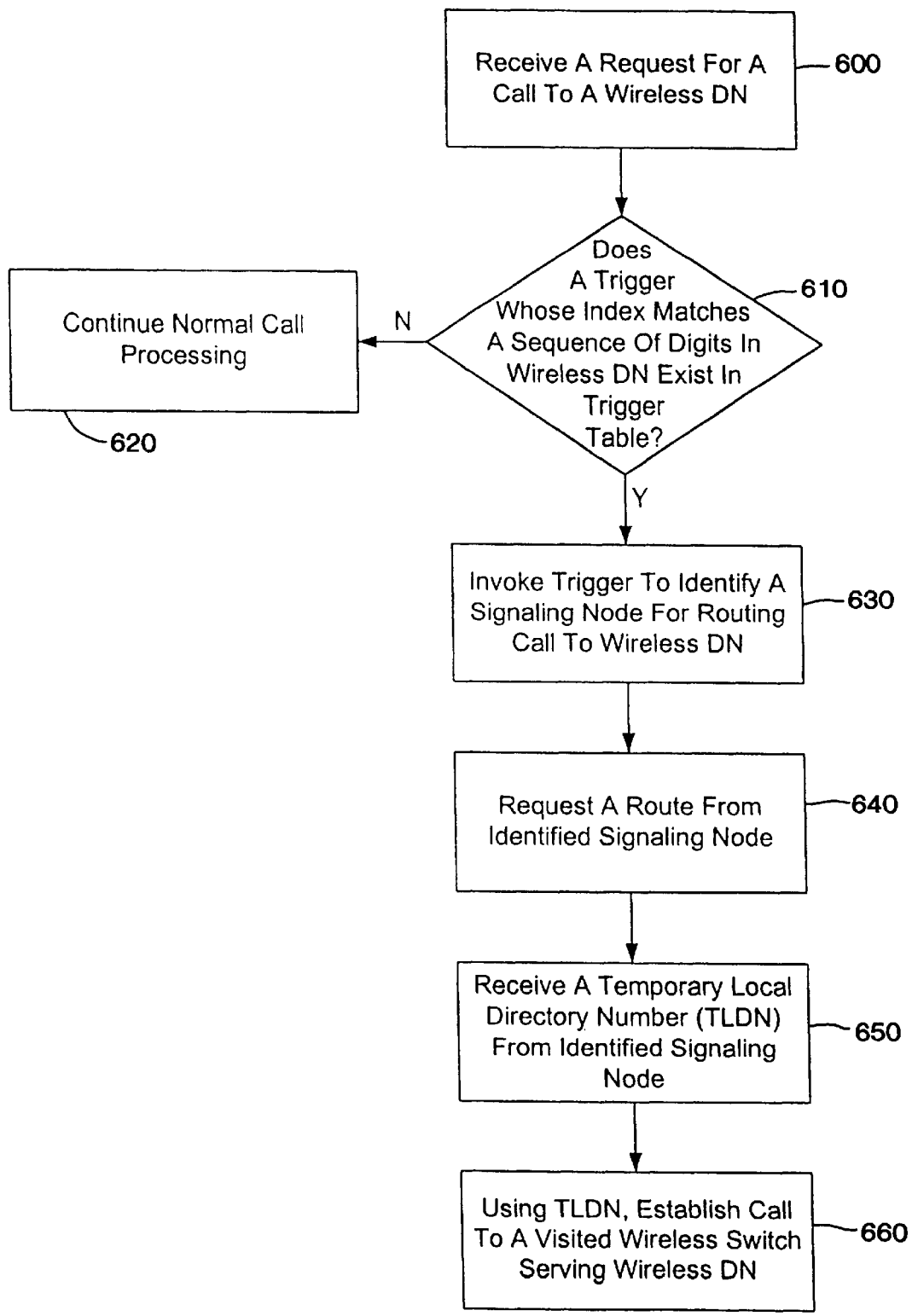
FIG. 6 is a flow chart of the steps performed by a call processing module in a wireline switch in accordance with methods and systems consistent with the present invention.

FIG. 6 is a flow chart of the steps performed by call processing 380 in wireline switch 210 when a wireline subscriber using telephone 155 originates a call to wireless device 175 in accordance with methods and systems consistent with the present invention. When the wireline subscriber dials the DN associated with wireless device 175, wireline switch 210 receives and processes a call request 180a in accordance with call processing 380 (step 600). Call processing 380 then determines whether trigger table 384 includes a trigger whose index matches a sequence of digits in the dialed DN such as, the area code, a combination of the area code and office code, or any other sequence of digits (step 610).

If call processing 380 determines that trigger table 384 does not include any triggers with a matching index, call processing 380 continues normal call processing (step 620). If trigger table 384 includes a trigger with a matching index, call processing 380 suspends normal call processing and invokes the trigger to identify a signaling node, for example signaling node 220, associated with the dialed DN (step 630).

In one embodiment, the invoked trigger includes the TT/GTA associated with signaling node 220. In this embodiment, call processing 380 then sends an AIN info_analyze message 230a via STP 225 to signaling node 220, requesting a route for establishing a call to the dialed DN (step 640). Info_analyze message 230a includes as its parameters the DN associated with the calling telephone 155 and the dialed DN associated with wireless device 175.

For example, call processing 380 may send info_analyze message 230a to STP 225 using a Signaling Connection Control Part (SCCP) message, which includes the TT/GTA associated with signaling node 220. Using the TT/GTA, STP 225 then determines from its internal tables the point code associated with signaling node 220 and forwards info_analyze message 230a to signaling node 220.

Alternatively, in another embodiment, the invoked trigger may include the point code associated with signaling node 220. In this embodiment, call processing 380 may send an AIN info_analyze message 230a directly to signaling node 220.

In response to info_analyze message 230a, if wireless device 175 is within its home area (not shown), call processing 380 receives from signaling node 220 an AIN continue response message. Call processing 380 then resumes normal call processing, and using the dialed DN, establishes a connection to home wireless switch 120, which sends a ring signal to wireless device 175.

However, if wireless device 175 is outside of its home area as shown in FIG. 2, call processing 380 receives from signaling node 220 an analyze_route response message 230e, which includes a temporary local directory number (TLDN) (step 650). Call processing 380 uses the TLDN to establish a connection 230f to visited wireless switch 150, which sends a ring signal to wireless device 175 (step 660).

Accordingly, a single connection 230f is established to a single wireless switch in telecommunications network 200 when establishing a call to wireless device 175 regardless of whether wireless device 175 is within or outside of its home area. In other words, when wireless device 175 is within its home area, a single connection is established to home wireless switch 120 as explained above. Likewise, when wireless device 175 is outside of its home area as shown in FIG. 2, a single connection is established to visited wireless switch 150.

Figure 7:
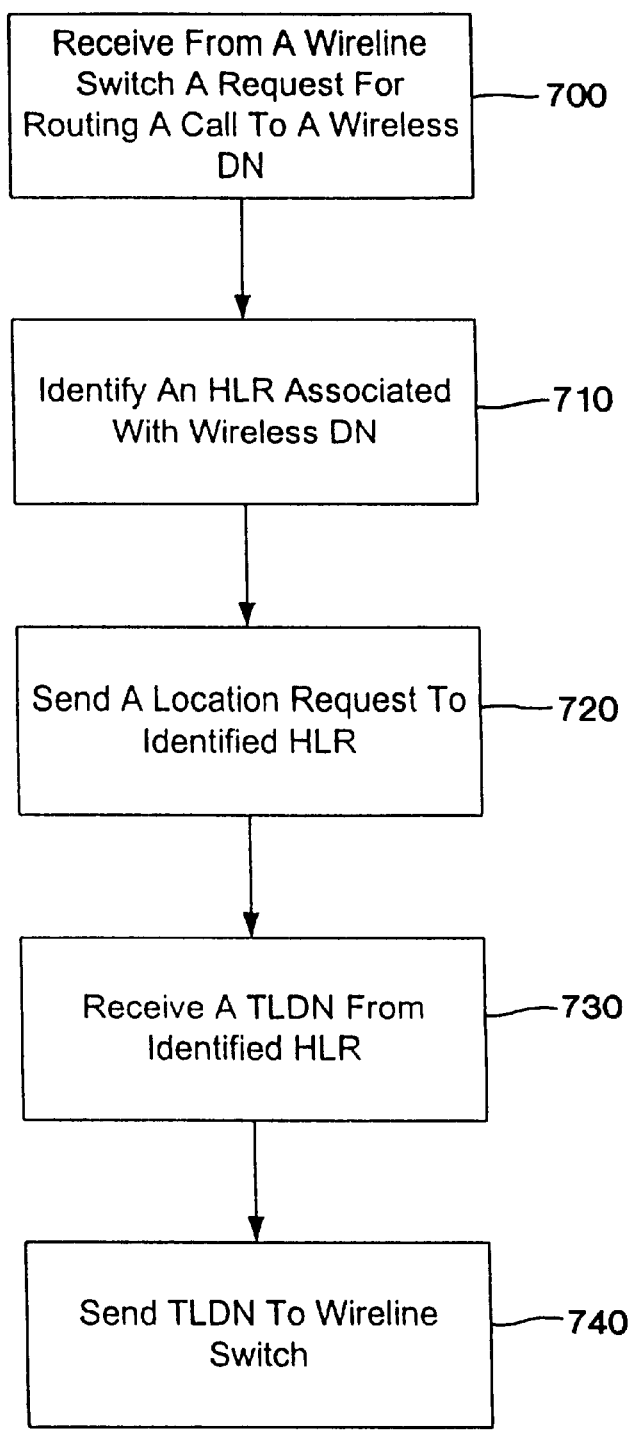
FIG. 7 is a flow chart of the steps performed by a call routing module in a signaling node in accordance with methods and systems consistent with the present invention.

FIG. 7 is a flow chart of the steps performed by call routing 570 in signaling node 220 when signaling node 220 receives from wireline switch 210 a request for routing a call to a dialed DN associated with wireless device 175 in accordance with methods and systems consistent with the present invention. When signaling node 220 receives info_analyze message 230a from wireline switch 210 (step 700), call routing 570 identifies a home location register, for example home location register 130, associated with the dialed DN (step 710).

Call routing 570 sends an IS-41 location_request message 230b via STP 235 to the identified home location register 130, requesting a route for establishing a call to the dialed DN (step 720). In response to location_request message 230b, if wireless device 175 is within its home area, home location register 130 sends to signaling node 220 via STP 235 a location_request_response message that includes the dialed DN. Based on the dialed DN value in the location_request_response message, call routing 570 determines that wireless device 175 is within its home area and sends via STP 225 an AIN continue response message to wireline switch 210. Using the dialed DN, wireline switch 210 then establishes a connection to home wireless switch 120, which sends a ring signal to wireless device 175.

However, if wireless device 175 is outside of its home area as shown in FIG. 2, home location register 130 identifies the visitor location register, for example visitor location register 140, with which wireless device 175 last registered, and sends an IS-41 route_request message 180d via STP 135 to the identified visitor location register 140. Visitor location register 140 then forwards route_request message 180d to its associated visited wireless switch 150, requesting a route to wireless device 175.

Visited wireless switch 150 computes a temporary local directory number (TLDN), which can be used for establishing incoming calls to wireless device 175. Visited wireless switch 150 then returns the TLDN to visitor location register 140 in an IS-41 message 180e. Visitor location register 150 then sends via STP 135 to home location register 130 an IS-41 route_request_response message 180f that includes the TLDN. When home location register 130 receives route_request_response message 180f, it sends via STP 235 to signaling node 220 an IS-41 location_request_response message 230c that includes the TLDN.

When signaling node 220 receives location_request_response message 230c from home location register 130 (step 730), call routing 570 sends analyze_route response message 230e via STP 225 to wireline switch 210, providing wireline switch 210 with the TLDN for establishing a call to wireless device 175 (step 740). Using the TLDN, wireline switch 210 establishes a connection 230f to visited wireless switch 150, which sends a rings signal to wireless device 175. Accordingly, only a single connection 230f is established to a single wireless switch (i.e., visited wireless switch 150) in telecommunications network 200 when establishing a call to wireless device 175 while wireless device 175 is outside of its home area.

Although aspects of one implementation are depicted as being stored in memory, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM. Finally, although specific components of a wireline switch and signaling node have been described, one skilled in the art will appreciate that a wireline switch and signaling node suitable for use with methods and systems consistent with the present invention may contain additional or different components.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for establishing a call to a wireless directory number associated with a home wireless switch coupled to a public network, said method comprising the steps of:

identifying, at a first switch, a signaling node associated with the wireless directory number;

determining, at the signaling node, a route within the public network that excludes the home wireless switch;

transmitting the determined route to the first switch; and establishing, by the first switch, a connection via the determined route to a visited node serving the wireless directory number, wherein the connection excludes the signaling node.

2. The method of claim 1, wherein the identifying step comprises the step of invoking a trigger indexed by an area code associated with the wireless directory number.

3. The method of claim 1, wherein the identifying step comprises the step of invoking a trigger indexed by an area code and an office code associated with the wireless directory number.

4. The method of claim 1, wherein the identifying step comprises the step of invoking a trigger indexed by a variable number of digits associated with the wireless directory number.

5. The method of claim 1, wherein the determining step comprises the step of requesting a route from a home location register associated with the wireless directory number.

6. The method of claim 1, wherein the determining step comprises the step of receiving a temporary location directory number from a home location register associated with the wireless directory number.

7. The method of claim 1, wherein the determining step comprises the steps of:
  receiving from a first node a request to route the call to the wireless directory number; and
  sending to the first node a temporary location directory number for establishing the call to the wireless directory number.

8. The method of claim 1, wherein the establishing step comprises the step of establishing the connection to a temporary local directory number assigned by the visited node to the wireless directory number.

9. A system, comprising:
  a first node including one or more predetermined triggers for identifying calls destined to wireless directory numbers;
  a home wireless switch, coupled to a public network, associated with the wireless directory numbers;
  a visited node serving at least one of the wireless directory numbers; and
  a signaling node, identified via the predetermined signals to be associated with the at least one of the wireless directory numbers, for determining a route within the public network that excludes the home wireless switch for one of the identified calls that is destined to one of the wireless directory numbers served by the visited node,
  wherein the identified signaling node transmits the determined route to the first node, and wherein the first node establishes a connection via the determined route to the visited node serving the at least one of the wireless directory numbers, the connection excluding the identified signaling node.

10. The system of claim 9, wherein one of the predetermined triggers includes an index and an identifier identifying the signaling node.

11. The network of claim 10, wherein the index includes an area code associated with one of the wireless directory numbers.

12. The network of claim 10, wherein the index includes an area code and an office code associated with one of the wireless directory numbers.

13. The system of claim 9, wherein the first node is a switching system.

14. The system of claim 9, wherein the signaling node is a service control point.

15. The system of claim 9, wherein the signaling node is an integrated service control point.

16. A computer-readable medium capable of configuring a computer to perform a method for establishing a call to a wireless directory number associated with a home wireless switch coupled to a public network, said method comprising the steps of:
  identifying a signaling node associated with the wireless directory number; receiving from the signaling node a route within the public network that excludes the home wireless switch when a visited node serves the wireless directory number; and
  establishing a connection via the determined route to the visited node, wherein the connection excludes the signaling node.

17. The method of claim 16, wherein the identifying step comprises the step of invoking a trigger indexed by an area code associated with the wireless directory number.

18. The method of claim 16, wherein the identifying step comprises the step of invoking a trigger indexed by an area code and an office code associated with the wireless directory number.

19. The method of claim 16, wherein the identifying step comprises the step of invoking a trigger indexed by a variable number of digits associated with the wireless directory number.

20. A computer-readable medium capable of configuring a signaling node to perform a method for establishing a call to a wireless directory number associated with a home wireless switch coupled to a public network, said method comprising the steps of:
  requesting from a home location register coupled to the public network a route to a wireless directory number;
  receiving from the home location register a temporary directory number when a visited node coupled to the public network serves the wireless directory number; and
  sending the received temporary directory number to a first node in the network for establishing a connection to the visited node, wherein said connection is by a route within the public network that excludes said home wireless switch and said signaling node.

21. A node coupled to a public network, comprising:
  a memory including a signal for identifying a signaling node associated with a wireless directory number having an associated home wireless switch coupled to a public network;
  a program stored in the memory for receiving from the signaling node a route within the public network that excludes the associated home wireless switch when the wireless directory number is served by a visited node and for establishing via the route a connection, which excludes the signaling node, to the visited node when establishing a call to the wireless directory number; and
  a processor for running the program.

22. The node of claim 21, wherein the trigger includes an index and an identifier associated with the signaling node.

23. A computer-readable memory device encoded with a data structure for establishing calls to wireless directory numbers having associated home wireless switches coupled to a public network, the data structure comprising:
  an index including at least one digit associated with at least one of the wireless directory numbers; and
  an identifier that identifies a signaling node, associated with the at least one of the wireless directory numbers, coupled to the public network for determining a route within the public network to one of the wireless directory numbers that includes said at least one digit, wherein the route excludes the home wireless switch and the signaling node.

24. The computer-readable memory device of claim 23, wherein the index includes an area code associated with at least one of the wireless directory numbers.

25. The computer-readable memory device of claim 23, wherein the index includes an area code and an office code associated with at least one of the wireless directory numbers.

26. The computer-readable memory device of claim 23, wherein the index includes a variable number of digits associated with at least one of the wireless directory numbers.

* * * * *